(12) United States Patent  
Forster

(10) Patent No.: US 6,334,512 B1
(45) Date of Patent: Jan. 1, 2002

(54) SHAFTLESS AXIAL PISTON MOTOR

(75) Inventor: Franz Forster, Karlstadt-Muhlbach (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/358,794

(22) Filed: Jul. 22, 1999

(30) Foreign Application Priority Data

Aug. 7, 1998 (DE) ......................................... 198 35 829
Nov. 25, 1998 (DE) ......................................... 198 54 415

(51) Int. Cl.$^7$ ............................................. F16D 55/36
(52) U.S. Cl. ....................................... 188/71.5; 475/83
(58) Field of Search .................... 475/72, 83; 180/242, 180/307, 308; 92/140; 188/71.5

(56) References Cited

U.S. PATENT DOCUMENTS

| | | | |
|---|---|---|---|
| 5,368,527 A | * 11/1994 | Forster | 475/83 |
| 5,391,123 A | * 2/1995 | Forster | 475/83 |
| 5,397,281 A | * 3/1995 | Forster | 475/83 |
| 5,528,978 A | * 6/1996 | Forster | 92/140 |
| 5,624,340 A | * 4/1997 | Forster | 475/72 |

FOREIGN PATENT DOCUMENTS

| | | | | |
|---|---|---|---|---|
| DE | 4235697 | * | 3/1994 | 475/83 |
| DE | 4432136 | * | 3/1996 | 475/83 |
| DE | 19642022 | | 1/1998 | |

* cited by examiner

Primary Examiner—Robert J. Oberleitner
Assistant Examiner—Devon Kramer
(74) Attorney, Agent, or Firm—Webb Ziesenheim Logsdon Orkin & Hanson, P.C.

(57) ABSTRACT

An axial piston motor utilizing swash plate construction, in particular a wheel motor, includes a stationary support part that contains a swash plate, a control surface and a rotating output part into which a cylinder drum is integrated. Common bearings are provided for mounting the cylinder drum and the support part. The bearings are located radially between the cylinder drum and a bearing bush that surrounds the cylinder drum and is connected with the rotating output part. The bearings, which are preferably roller bearings, absorb both the external forces (wheel loads) and also the engine forces.

15 Claims, 1 Drawing Sheet

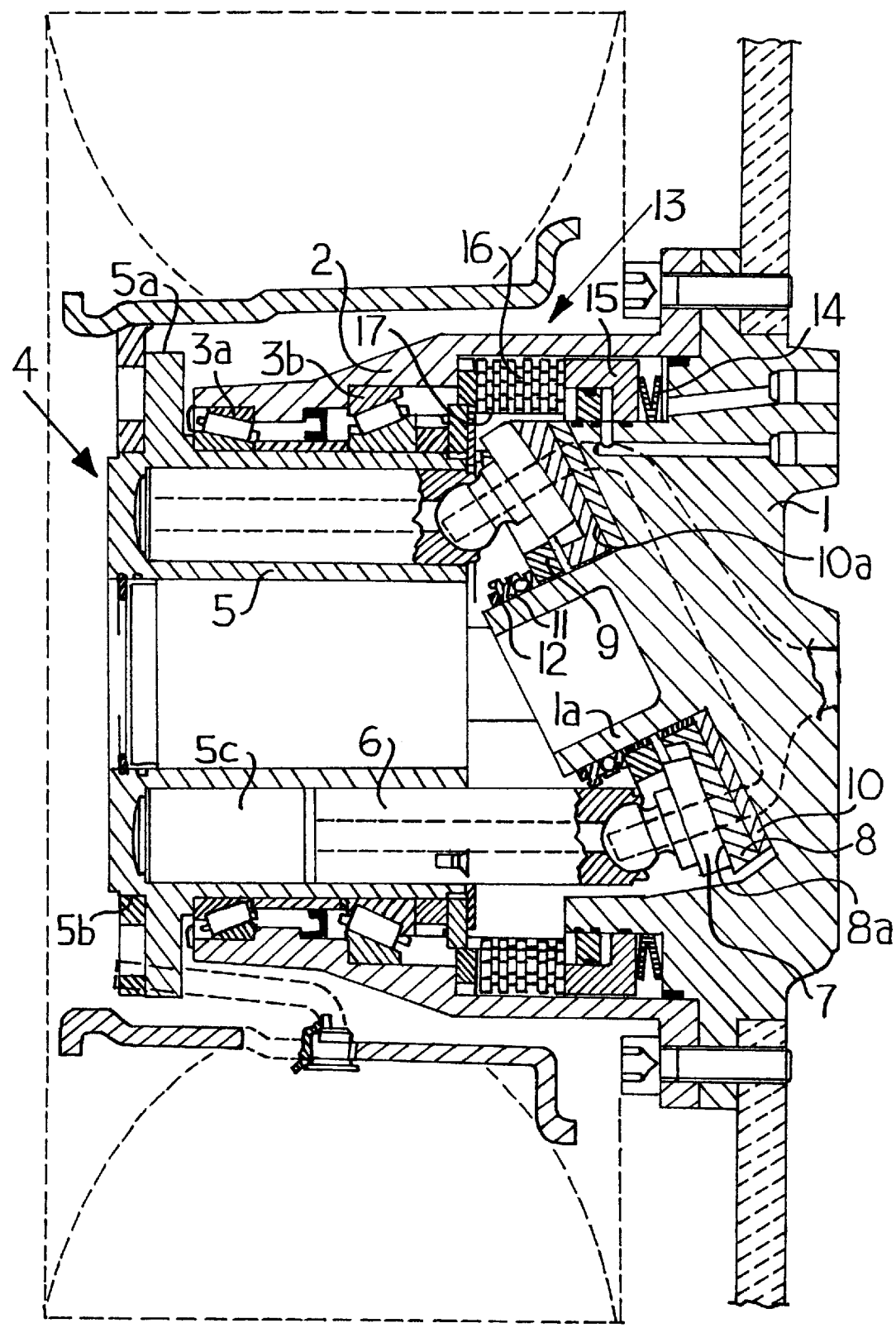

SHAFTLESS AXIAL PISTON MOTOR

BACKGROUND OF THE INVENTION

This invention relates generally to an axial piston motor that utilizes a swash plate construction, in particular a wheel motor, with a stationary support part that contains a swash plate and a control surface and a rotating output part into which a cylinder drum is integrated. Common bearings are present for mounting the cylinder drum and the support part.

An axial piston motor of the type described above, in which the cylinder drum acts directly as the output part without the interposition of an output shaft (and which is why such an axial piston motor can also be called "shaftless"), is described in DE 196 42 022 A1, which is herein incorporated by reference. This known axial piston motor consists of only a small number of individual parts. On the known axial piston motor, the wheel loads are introduced into the stationary support part by means of a stud axle. The wheel loads determine the diameter of the stud axle and thus the minimum dimensions of the cylinder drum and of the axial piston motor in the radial direction.

An object of this invention is to provide an axial piston motor of the type defined above, the cylinder drum of which can be configured with smaller radial dimensions.

SUMMARY OF THE INVENTION

The invention teaches that bearings are located radially between a cylinder drum and a bearing bush that is connected with a support part and surrounds the cylinder drum. A teaching of the invention is consequently to provide an external arrangement of bearings of the cylinder drum in a bearing bush. Such a layout makes it possible to reduce the dimensions of the cylinder drum and of the axial piston motor in the radial direction, as a result of which the weight of the cylinder drum and of the entire drive system can be significantly reduced. An axial piston motor in accordance with the invention therefore has higher dynamic characteristics than the known axial piston motor described above, and can be operated at higher speeds. As a result of the reduced dimensions, the manufacturing costs can also be reduced. As a result of the realization of the axial piston motor as taught by the invention, very small modules can be manufactured. It is also possible, however, to utilize the space made available as a result of the elimination of the stud axle and of the "inner" bearing located on it for a purpose other than a reduction in the size of the cylinder drum.

The space available radially inside the cylinder bores in the cylinder drum, which space is required in the known axial piston motor for the stud axle and the bearings and therefore results in a specified minimum size of the axial piston motor, can be used, for example, for the installation of a device to compensate the engine forces (axial forces) of the axial piston motor. Such a device is described in the above referenced DE 196 42 022 A1, which is herein incorporated by reference. Because such a device, in itself, requires significantly less space than a stud axle to absorb the wheel loads, the cylinder drum can therefore be made smaller.

As long as the engine forces do not exceed certain levels, it is significantly more advantageous, however, if the bearings are realized so that they can absorb both the external forces (wheel loads) and the engine forces. In that case, it is no longer necessary to have a compensation device for the engine forces.

In one particularly advantageous embodiment of the invention, a swash plate is located and oriented so that under operating conditions, the radial components of the engine forces are directed substantially opposite to the wheel loads. The bearings are consequently relieved of the wheel loads. There is a reduction of the bearing load caused by the vertical forces, as a result of which the useful life of the bearings can be increased significantly. The bearings may be made of two tapered roller bearings in an O-layout, in particular conical roller bearings.

The axial piston motor of the invention can be configured both with a constant absorption volume and with a variable absorption volume.

In one layout that has advantages in terms of fabrication, a swash plate in the form of an annular disc is coupled so that it rotates in synchronization with the cylinder drum, is in contact against the control surface of the axial piston motor, and is provided with passage openings to connect cylinder bores of the cylinder drum with hydraulic connections of the axial piston motor.

In another particularly advantageous embodiment of the invention, the swash plate has a bearing surface to support reciprocating pistons. The bearing surface is provided with a concave curvature, and in particular a spherical curvature. As a result of such a shape of the bearing surface, the piston transverse force (radial force) that acts on the reciprocating piston that is extended farthest out of its cylinder bore and is exposed to the operating pressure, which transverse force results from the splitting of forces on the support of the reciprocating piston on the bearing surface of the swash plate, is determined not only by the tilt angle of the swash plate but also by the curvature of the bearing surface. The result, taking into consideration the curvature of the bearing surface, is that the support angle of the reciprocating piston on the bearing surface of the swash plate is smaller than the tilt angle of the swash plate.

Consequently, with the same tilt angle of the swash plate as in the known motor, the piston transverse force of the reciprocating piston that is extended farthest from its bore is reduced. This situation can be used to advantage so that at the same maximum allowable piston transverse force, i.e. taking advantage of the maximum allowable material loads, the tilt angle of the swash plate can be increased, and thus the output of the axial piston motor of the invention can be significantly increased.

The curvature of the bearing surface is appropriately designed so that the surface pressures of the reciprocating pistons in the cylinder bores and/or the deflections of the reciprocating pistons that occur during operation preferably do not differ from one another by more than about 20%, and more preferably by not more than about 10%. In this manner, there is a substantially uniform loading of all the reciprocating pistons and cylinder bores.

The invention teaches that in a particularly advantageous axial piston motor, the tilt angle of the swash plate is preferably between about 20° and 30°. Such an axial piston motor has small outside dimensions and a large geometric volume flow, and thus a high output capacity. On account of the curvature of the bearing surface of the invention, however, the loads on the reciprocating pistons and cylinder bores are nevertheless not greater than those of engines of the prior art.

In terms of fabrication technology, it is favorable if the control surface is located on a control slide. The control slide can thus be manufactured separately, which facilitates the introduction of the control slots. The swash plate and the control slide are advantageously located on an inclined stud formed on the support part. A spring force is applied to them with the interposition of an axial bearing.

In one advantageous refinement of the invention, a brake is located between the support part and the output part. This brake is preferably a hydraulically releasable spring-loaded brake.

When the axial piston motor of the invention is used as a wheel drive mechanism, it is favorable if the cylinder drum is provided with a wheel fastening flange and a rim centering.

BRIEF DESCRIPTION OF THE DRAWING

Additional advantages and details of the invention are explained in greater detail below with reference to the exemplary embodiment illustrated in the accompanying schematic drawing FIGURE.

The drawing FIGURE is a sectional view of an axial piston motor incorporating features of the invention.

DESCRIPTION OF THE PREFERRED EMBODIMENT

For purposes of the description hereinafter, the terms "right", "left", "upper", "lower", "above", "below" and similar directional terms shall relate to the invention as it is oriented in the drawing FIGURE. However, it is to be understood that the invention may assume various alternative variations and step sequences, except where specified to the contrary. It is also to be understood that the specific device illustrated in the attached drawing, and described in the following specification, is simply an exemplary embodiment of the invention. Hence, specific physical characteristics related to the embodiment described herein are not to be considered as limiting.

The FIGURE shows a section through an axial piston motor utilizing swash plate construction and configured in the form of a wheel drive with a constant absorption volume. The FIGURE is in the direction of a longitudinal center plane of the axial piston motor, as a result of which the inclination of the swash plate of the axial piston motor is visible.

The axial piston motor has a stationary support part 1 for fastening to a component that is solidly affixed to the vehicle (frame, axle, etc.) and is connected with a bearing bushing or bush 2. Radially inside the bearing bush 2, mounted by means of two bearings 3a and 3b, preferably tapered roller bearings in an O-arrangement, more preferably conical roller bearings, is an output part 4. The output part 4 comprises a cylinder drum 5 of the axial piston motor. Formed onto the cylinder drum 5 are a wheel flange 5a and a rim centering 5b. As a result of the external arrangement of the bearings of the cylinder drum in the bearing bush 2, the axial piston motor of the invention can be constructed with reduced dimensions in the radial direction, which reduces weight. The dynamic characteristics are thereby increased, e.g., smaller rotation moments, and the limit speed of rotation is significantly increased. The fabrication costs are also reduced.

The bearings 3a and 3b are sized so that they are able to absorb both the external forces (wheel loads) and the engine forces. For this purpose, the bearing 3b on the right in the FIGURE is sized larger than the bearing 3a on the left in the FIGURE. If the engine forces to be absorbed require larger bearings, and these larger bearings cause space problems, a device to compensate for these engine forces (axial forces) of the axial piston motor can be installed in the space available radially inside the cylinder bores in the cylinder drum 5 which, in the axial piston motor of the prior art, is required for the stud axle and the bearings. The bearings can then absorb the external forces generated by the wheel load and the transverse forces from the engine.

A swash plate 8 is located so that under operating conditions, the radial components of the engine forces are directed opposite to the wheel loads (i.e. as shown in the FIGURE, the swash plate 8 is tilted so that in the lower portion of the axial piston motor close to the road, the swash plate 8 is at a greater axial distance from the cylinder drum 5 than in the upper portion). This makes it possible to achieve a long, useful life of the bearings 3a and 3b.

The cylinder drum 5 has concentric cylinder bores 5c, in each of which a reciprocating piston 6 can move longitudinally. The piston 6 is supported by a sliding block or slipper 7 on a bearing surface 8a of the swash plate 8 that is realized on the swash plate 8 in the form of an annular disc. The slippers 7 are pushed toward the bearing surface 8a by a hold-down plate 9, which is also in the shape of an annular disc. The bearing surface 8a of the swash plate 8 is provided with a concave curvature, at least in the vicinity of the reciprocating piston 6 that is extended farthest out of the cylinder bores 5c. This curvature is preferably realized in the form of a spherical curvature. As a result of the curvature of the bearing surface 8a, the tilt angle of the swash plate 8 is not the only factor in the splitting of forces on the bearing surface 8a, but also an angle that results from the curvature. For the reciprocating piston 6 that is extended the farthest out of its cylinder bore 5c, the result, in terms of the splitting of forces on the bearing surface 8a is a support angle that results from the difference between the tilt angle and the angle determined by the curvature of the bearing surface 8a, and which is correspondingly smaller than the tilt angle of the swash plate 8.

Consequently, with an unchanged tilt angle, there is a reduced piston transverse force as a result of the concave curvature of the bearing surface 8a in the vicinity of the reciprocating piston 6 that is extended farthest out of its cylinder bore 5c. On the other hand, this effect, e.g., taking advantage of the allowable material loads, with a constant, maximum possible piston transverse force, makes it possible to increase the tilt angle of the swash plate 8, which is equivalent to an increase in the geometric volume flow and thus to an increase in the output of the axial piston machine.

For purposes of completeness, it should be mentioned that with a curvature of the bearing surface 8a as illustrated in this exemplary embodiment, the support angle that results for the reciprocating piston 6 that is inserted the farthest into its cylinder bore 5c results from the addition of the tilt angle and the angle determined by the curvature of the bearing surface 8a. The support angle is accordingly larger than the tilt angle. Consequently, of course, there are increased piston transverse forces for the reciprocating pistons 6 inserted in the bores. However, these forces are not critical with respect to the loads that result from the surface pressure and the deflection of the reciprocating piston 6 because the reciprocating piston 6 is supported over its entire length in the cylinder bore 5c with respect to the transverse piston force.

For the most uniform possible loading of the cylinder drum 5 and of the reciprocating pistons 6, the curvature of the bearing surface 8a is preferably designed so that the surface pressures of the reciprocating pistons 6 in the cylinder bores 5c and/or the deflections of the reciprocating pistons 6 that occur during operation do not differ from one another by more than about 20%, and in particular by not more than about 10%. The axial piston motor of the invention preferably has a tilt angle of the swash plate 8 that is between about 20° and 30°.

The control of the axial piston motor is exercised by means of a control slide 10 that is provided with control slots and is in the shape of an annular disc, and has a control surface 10a. So that the cylinder bores 5c can be supplied with hydraulic fluid, there are passage openings in the swash plate 8 and the slippers 7, as well as in the reciprocating pistons 6.

The swash plate 8 and the hold-down plate 9 rotate in synchronization with the cylinder drum 5 and are pressed by means of an axial bearing 11 and spring force (belleville spring washers 12) against the non-rotating control slide 10.

The control slide 10, the swash plate 8 and the hold-down plate 9 are located on an inclined stud formed on the support part 1. When the axial piston machine of the invention is realized with variable absorption volume, a diagonal stud 1a can be rotated to adjust the tilt angle of the swash plate 8.

Between the output part 4 and the support part 1 there is a spring-loaded brake 13. This brake 13 is pushed toward a closing position by the force of biasing elements, such as belleville spring washers 14, and can be released hydraulically by an annular piston 15 with a substantially L-shaped cross section. The spring-loaded brake 13 has a multiple-disc packet 16 in which the individual discs can be connected alternately with the bearing bush 2 or with a driving lug 17 that is connected with the cylinder drum 5.

All the hydraulic connections (high pressure, low pressure, brake pressure, ventilation) of the axial piston motor of the invention are preferably located on the end of the support part 1 to the right in the FIGURE.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. An axial piston motor, comprising:
   a stationary support part having a swash plate and a control surface;
   a rotating output part including a cylinder drum; and
   common bearings for directly mounting the cylinder drum and the rotating output part,
   wherein the bearings are located radially between the cylinder drum and a bearing bush that surrounds the cylinder drum and is connected with the support part, and wherein the bearings are configured to absorb both external forces and also engine forces.

2. The axial piston motor as claimed in claim 1, wherein a tilt angle of the swash plate is between about 20° to 30°.

3. The axial piston motor as claimed in claim 1, wherein the control surface is located on a control slide.

4. The axial piston motor as claimed in claim 1, including a brake located between the support part and the output part.

5. The axial piston motor as claimed in claim 4, wherein the brake is a hydraulically releasable spring-loaded brake.

6. The axial piston motor as claimed in claim 5, wherein the cylinder drum includes a wheel fastening flange and a rim centering.

7. The axial piston motor as claimed in claim 1, wherein the bearings are conical roller bearings.

8. An axial piston motor, comprising:
   a stationary support part having a swash plate and a control surface;
   a rotating output part including a cylinder drum; and
   common bearings for mounting the cylinder drum and the rotating output part,
   wherein the bearings are located radially between the cylinder drum and a bearing bush that surrounds the cylinder drum and is connected with the support part, wherein the swash plate is at a greater axial distance from the cylinder drum at a lower portion of the axial piston motor than in an upper portion of the axial piston motor, wherein the swash plate is oriented such that radial components of the engine forces, under operating conditions, are directed substantially opposite to the wheel loads.

9. An axial piston motor, comprising:
   a stationary support part having a swash plate and a control surface;
   a rotating output part including a cylinder drum; and
   common bearings for directly mounting the cylinder drum and the rotating output part,
   wherein the bearings are located radially between the cylinder drum and a bearing bush that surrounds the cylinder drum and is connected with the support part, wherein the bearings which are located radially between the cylinder drum and the bearing bush include two tapered roller bearings in an O-arrangement.

10. An axial piston motor, comprising:
    a stationary support part having a swash plate and a control surface;
    a rotating output part including a cylinder drum; and
    common bearings for mounting the cylinder drum and the rotating output part,
    wherein the bearings are located radially between the cylinder drum and a bearing bush that surrounds the cylinder drum and is connected with the support part and wherein the bearings are configured to absorb both external forces and also engine forces, wherein the swash plate is in the shape of an annular disc and is rotationally coupled in synchronization with the cylinder drum, wherein the swash plate is in contact with the control surface of the axial piston motor, and wherein the swash plate is provided with passage openings to connect cylinder bores of the cylinder drum with hydraulic connections of the axial piston motor.

11. An axial piston motor, comprising:
    a stationary support part having a swash plate and a control surface;
    a rotating output part including a cylinder drum; and
    common bearings for mounting the cylinder drum and the rotating output part,
    wherein the bearings are located radially between the cylinder drum and a bearing bush that surrounds the cylinder drum and is connected with the support part,
    wherein the swash plate includes a bearing surface that is provided to support reciprocating pistons, which bearing surface includes a concave curvature.

12. The axial piston motor as claimed in claim 11, wherein the bearings include a pair of bearings axially spaced along the axial piston motor with the bearing located axially closer to the swash plate sized larger than the remaining bearing whereby the bearings are configured to absorb both external forces and also engine forces.

13. The axial piston motor as claimed in claim 11, wherein the curvature of the bearing surface is configured such that at least one of surface pressures of the reciprocating pistons in the cylinder bores and deflections of the reciprocating pistons that occur during operation do not differ from one another by more than about 20%.

14. The axial piston motor as claimed in claim 11, wherein the curvature is substantially spherical.

15. An axial piston motor, comprising:
a stationary support part having a swash plate and a control surface;
a rotating output part including a cylinder drum; and
common bearings for mounting the cylinder drum and the rotating output support part,
wherein the bearings are located radially between the cylinder drum and a bearing bush that surrounds the cylinder drum and is connected with the support part, and wherein the control surfaces are located on a control slide, and wherein the swash plate and the control slide are located on an inclined stud formed on the support part and are subjected to the force of a spring with the interposition of an axial bearing.

* * * * *

UNITED STATES PATENT AND TRADEMARK OFFICE
CERTIFICATE OF CORRECTION

PATENT NO. : 6,334,512 B1
DATED : January 1, 2002
INVENTOR(S) : Franz Forster

It is certified that error appears in the above-identified patent and that said Letters Patent is hereby corrected as shown below:

<u>Column 3,</u>
Line 51, after "cylinder drum" insert -- 5 --.

<u>Column 5,</u>
Line 57, "claimed in claim 5" should read -- claimed in claim 1 --.

Signed and Sealed this

Thirteenth Day of August, 2002

Attest:

Attesting Officer

JAMES E. ROGAN
*Director of the United States Patent and Trademark Office*